United States Patent Office 3,299,028
Patented Jan. 17, 1967

3,299,028
SOLID OLEFINIC POLYMERS CONTAINING CRYSTALLINE COMPONENTS AND PROCESS OF PRODUCING SAME
Joseph P. Kennedy, Clark, N.J., assignor to Esso Research and Engineering Company, a corporation of Delaware
No Drawing. Filed May 24, 1963, Ser. No. 282,884
4 Claims. (Cl. 260—93.7)

The present invention relates to solid alpha olefinic polymers containing crystalline components and to the novel process of producing these polymers. More particularly, the invention relates to the low temperature polymerization of 3-methyl-1-butene or 4-methyl-1-pentene using Friedel-Crafts type catalysts in normally liquid organic solvents while maintaining extremely low temperatures.

In the past, alpha monoolefins have been subjected to various polymerization reactions for the purpose of producing polymers of high molecular weight, the controlling of the molecular weight giving rise to products which are either normally liquid in character, semi-solid or viscous in character, or which, at room temperatures, are rubbery, tough, solid polymers. These products have been produced through the polymerization of alpha isomonoolefins subjected to Friedel-Crafts type catalysts and the molecular weights have ranged generally between 1,000 and 500,000 and even higher. The temperatures employed have ranged far below 0° C. In these previous polymerization reactions, the temperatures employed have ranged from about —10° C. down to as low as —100° C. but the products produced were wholly amorphous in character. They are plastic, elastic, rubbery-like substances whose utility can best be described as being suitable for use as addition agents in paints, varnishes, lacquers, and the like, as plasticizers, tougheners, and diluents. A typical disclosure of the type of process carried out and the products produced by those earlier investigators in this field is the Thomas and Reynolds, Jr. U.S. Patent No. 2,387,784, patented October 30, 1945. A typical example of the type of treatment involved is shown in Example 5 of that patent in which aluminum chloride dissolved in ethyl chloride simultaneously was mixed with 3-methyl-1-butene in an ethyl chloride solvent. The two solutions were precooled to —78° C. and admixed while maintaining that temperature during the admixture and reaction. The product is said to have had a molecular weight of 6,500, a bromine number of 3, and is described as being a rubber-like substance.

In contrast to the prior process and products produced in the field to which the present invention relates, the instant invention can be succinctly described as involving substantially the same type of catalysts, substantially the same type of reactants, and substantially the same type of solvents. But here, the similarity ends. It has now been discovered that in the case of the polymerization of 3-methyl-1-butene or 4-methyl-1-pentene, radically different types of final polymers can be produced in carrying out this reaction if the temperature of the reaction is carefully controlled for, it has been discovered, in the case of the polymerization of 3-methyl-1-butene, a critical temperature of between about —120° and about —150° C.; and in the case of 4-methyl-1-pentene, a critical temperature of between about —50° and —80° C. surprisingly produces final polymeric products which are not altogether amorphous in character but which have a considerable percentage of crystalline substances in association with the final products. Such polymers, it will be appreciated, exhibit radically different properties from those polymers which are composed entirely of amorphous materials. Although, in carrying out the present novel process, it has not been so far possible to attain final products which are entirely crystalline in character, it has now conclusively been proven that a sizeable proportion of the final product obtained in carrying out these novel processes is, in fact, crystalline in character.

Such crystalline polymeric alpha monoolefins are solid at ambient temperatures; they exhibit certain improved structural strength, inherently; they have a reduced tendency to flow; and they are less subject to deformation than are the products produced and described in the Thomas et al. Patent No. 2,387,784. They readily lend themselves to ultimate uses which are not encompassed, because of the difference in properties; by the Thomas et al. products. It was indeed surprising to discover that within the aforementioned critical temperature ranges, it was possible to produce a solid polymeric alpha olefin, a portion of which was crystalline in character. It is, of course, true that the lower the percentage of crystallinity in the product the more rubber-like the polymer is and the higher the percentage of crystallinity in the final polymeric material the more rigid and nonrubbery the polymer is. Those polymers containing as much as 20 to 25% of crystalline components readily lend themselves to the formation of fibers, films, molding compositions, or, in other words, to uses in which the higher structural strength materials are customarily employed. These crystalline-containing polymers are novel and the uses to which they are put are those to which other olefinic polymers of high crystallinity have been put, i.e., substantially the same uses and same types of uses as those for isotactic polypropylene and isotactic polyethylene.

The present invention comprises, as starting materials, only two specific olefinic compounds, namely, 3-methyl-1-butene and 4-methyl-1-pentene. No other branched chain alpha monoolefins have been found from which solid polymers containing crystalline components can be produced.

Similarly, it is critical to the successful production of crystalline components in the final polymers that a temperature be maintained in the reaction zone in the case of the polymerization of 3-methyl-1-butene of between about —120° C. and about —150° C. and in the case of the polymerization of 4-methyl-1-pentene to maintain a temperature in the reaction zone of between about —50° C. and about —80° C.

Various Friedel-Crafts type catalysts may be employed such as aluminum chloride, aluminum bromide, titanium titanium tetrachloride, boron trifluoride, and the like such as $C_2H_5AlCl_2$ and $(C_2H_5)_2AlCl$ and any inert organic solvent which is liquid under the reaction temperature conditions may be employed. Examples of the type of solvent which has been found to be suitable, depending upon the particular temperatures employed, may be selected from the following: methyl chloride, ethyl chloride, carbon disulfide, propyl chloride, chloroform, ethylene dichloride, vinyl chloride, n-pentane, n-hexane, n-butane, methyl bromide, ethyl bromide, and similar types of solvents or mixtures of two or more of these solvents. The preferred solvent in the polymerization of 3-methyl-1- butene is ethyl chloride and in the polymerization of 4-methyl-1-pentene is methyl chloride, although other suitable solvents selected from those previously mentioned could just as easily be employed since the solvent serves merely as a vehicle for carrying out the reaction.

The amount of catalyst employed may vary over a considerable range but, in general, will be in an amount ranging from between about 0.5 wt. percent and about 6.0 wt. percent, preferably between about 1 wt. percent and about 3 wt. percent of the entire reaction mixture. In general, a solution of the catalyst in a portion of the solvent ultimately to be employed in the reaction, as a preformed solution is made up and this solution containing the dissolved catalyst in precooled condition is added to a second solution of the same solvent, or a different but compatible one, if desired, also precooled, containing the particular olefinic reactant to be employed. Alternatively, the precooled olefinic reactant may be added to the catalyst dissolved in the precooled total solvent employed. In any event, best reaction occurs by adding all of the one solution to the other solution at one time instead of incrementally.

The reaction vessel employed may be of any suitable construction but need not be a pressure vessel. It should be provided with a cooling jacket through which cooling liquid is circulated so as to maintain the reactants at the desired low reaction temperature.

In general, the time necessary for effective reaction is not critical although it is well to allow sufficient time for the polymerization to reach substantial equilibrium and thus completion. Sixty minutes, it has been found, is generally ample time. As will be seen from the table of data hereinafter described, times of reaction up to as high as 200 and 300 minutes have been employed but such lengthy periods for reaction are not necessary and after a total lapsed time of between about 30 and about 90 minutes, in almost all instances, the polymerization reaction is substantially complete.

In the following examples the particular Friedel-Crafts catalyst shown was dissolved in a solvent so as to give a catalyst solution containing between about 0.5 and 1.5 wt. percent of catalyst in the solution. Table 1 shows the respective amounts of materials used in each example. In all cases the catalyst solution and the olefinic reactant as well as the particular inert organic solvent were precooled to the indicated temperature of reaction before the various solutions were allowed to contact one another. As between the various examples, there was some minor variation in the amounts of catalyst used but such variations were not sufficiently great to materially alter the results obtained and shown in the table and for this reason the exact weight of catalyst used is not shown. It was always between 0.5 and 1.5 wt. percent based on the catalyst solution used.

The example numbers appearing in the following Table I correspond to the same example numbers appearing in Table II. Table I shows the amounts of monomer, solvent, and catalyst solution introduced during the runs shown in Table II.

TABLE I

| Example No. | Ml. of Monomer [1] | Ml. of $C_2H_5Cl$ solvent [1] | Ml. of $C_5H_2Cl$ catalyst solution [1] |
|---|---|---|---|
| 1 | 60 | 142 | 108 |
| 2 | 60 | [2] 142 | 108 |
| 3 | 315 | 315 | 230 |
| 4 | 240 | [3] 468 | 275 |
| 5 | 100 | 0 | 75 |
| 6 | 30 | 71 | 12 |
| 7 | 25 | 250 | [4] 130 |
| 8 | 25 | 90 | 150 |
| 9 | 100 | 0 | 47 |
| 10 | 35 | [5] 215 | [5] 80 |

[1] Volumes measured at $-78°$ C.
[2] Vinyl chloride as solvent.
[3] n-Pentane as solvent.
[4] Solvent was 70 ml. $C_2H_5Cl$ and 60 ml. $CH_3Br$.
[5] $CH_3Cl$ as solvent.

As indicated in Table II, the product is expressed in terms of weight percent based on the total amount of olefinic feed employed in the reaction and the molecular weight of the product so produced was determined by the conventional intrinsic viscosity method.

At the conclusion of the indicated time for reaction, the reactant mixture was contacted and quenched with about 100 cc. of propanol, precooled to the indicated reaction temperature, the resultant slurry filtered, and the recovered crystalline polymer dried in an oven maintained at ambient temperature. The reaction vessel was maintained at the indicated reaction temperature by jacketing the same and maintaining it in a liquid nitrogen bath. The temperature of the reaction was also controlled and maintained by means of a cryostat which was electronically controlled but the initial source of cooling was liquid nitrogen. The bath surrounding the liquid nitrogen was actually pentane but the cooling means was still through the use of liquid nitrogen. By this procedures, of $-20°$ C. down to $-180°$ C. could be conveniently maintained for an extended period of time. The temperature control equipment used has been disclosed in the following publication: J. P. Kennedy and R. M. Thomas, "Advances in Chemistry Series," No. 34, Chapter 7, page 111 (1962), published by the American Chemical Society, Washington, D.C.

TABLE II

| Example No. | Temp. of Reaction, °C. | Olefin reactant | Solvent | Catalyst dissolved in ethyl chloride | Time of reaction, minutes | Percent by weight product, based on reactant | Product mol. weight Intrinsic Viscosity Method | Weight Percent [1] Crystallinity of Product |
|---|---|---|---|---|---|---|---|---|
| 1 | $-130$ | 3-$CH_3$-1-butene | $C_2H_5Cl$ | $AlCl_3$ | 220 | 16.0 | 51,000 | 25-30 |
| 2 | $-130$ | do | Vinyl chloride | $AlCl_3$ | 225 | 5.7 | 33,000 | 10-15 |
| 3 | $-130$ | do | $C_2H_5Cl$ | $AlCl_3$ | 291 | 3.09 | 26,500 | 15-20 |
| 4 | $-130$ | do | n-Pentane | $AlCl_3$ | 1,529 | 23.0 | 25,500 | 25-30 |
| 5 | $-150$ | do | $C_2H_5Cl$ | $AlCl_3$ | 225 | 3.2 | [2] 9,000 | 15-20 |
| 6 | $-100$ | do | $C_2H_5Cl$ | $AlCl_3$ | 35 | 62.5 | 21,500 | [3] |
| 7 | $-130$ | do | $C_2H_5Cl$ | $AlBr_3$ in $CH_3Br$ and $C_2H_5Cl$ mixture. | 30 | 5.2 | 10,700 | 15-20 |
| 8 | $-130$ | do | $C_2H_5Cl$ | $TiCl_4$ | 120 | 1.8 | [2] 2,500 | 10-15 |
| 9 | $-130$ | do | $C_2H_5Cl$ | $BF_3$ | 315 | 5.2 | 45,000 | 5 |
| 10 | $-78$ | 4-$CH_3$-1-pentene | $CH_3Cl$ | $AlCl_3$ in $CH_3Cl$ | 10 | 93.0 | [2] 2,000,000 | 5 |

[1] Crystallinity was determined through the use of the conventional X-ray diffraction technique. See A. Weidinger & P. H. Hermans, Macromolecülare Chemie, 50:98 (1961). Example 6 shows the product obtained where a temperature of $-100°$ C. was used. The product was entirely amorphous.
[2] About.
[3] Amorphous.

The data presented in Table II indicate sizeable percentages of crystalline components in the final polymeric material with the exception of Example 6 in which the temperature employed was only $-100°$ C., in which case only amorphous polymer was formed. In all other instances, temperatures employed were in the aforementioned temperature ranges for the particular reactant employed and in all instances at least 5 wt. percent of the polymer was of crystalline nature. Example 1 shows a polymer which had from 25 to 30% of crystalline material. Such a product is suitable for use in molding compositions and for plastic films and sheeting.

*Example 11*

About 17.25 grams of the polymer product of Example 10 was reacted with about 3 grams of N-bromosuccinimide for about 30 minutes in an air oven at 300° F. 20.2 grams of the resultant product was compounded with 10 grams of HAF carbon black, 0.4 gram of diethylene diamine, and 1 gram of MgO and aliquots thereof vulcanized at 307° F. for various lengths of time ranging from 5 to 60 minutes. The resultant vulcanized polymer test specimens possessed tensile strengths ranging up to as high at 2100 p.s.i. measured by the conventional method. The product is useful in automobile tire compositions, inner tubes therefor, and rubber articles exposed to outdoor weathering.

Having now thus fully described and illustrated the character of the invention, what is desired to be secured by Letters Patent is:

1. A process which comprises polymerizing 3-methyl-1-butene at a temperature between about −120° C. and about −150° C. in an inert, precooled, organic solvent with a Friedel-Crafts type catalyst selected from the group consisting of aluminum chloride, aluminum bromide, boron trifluoride, and titanium tetrachloride and recovering from the reacted mixture a solid polymer having crystalline components therein.

2. A process as in claim 1 wherein the catalyst is aluminum chloride.

3. The proceeds as in claim 1 wherein the solvent is a lower alkyl chloride.

4. The process as in claim 1 wherein the catalyst is aluminum chloride, the solvent is ethyl chloride, and the reaction temperature is maintained at about −130° C.

References Cited by the Examiner
UNITED STATES PATENTS 2,387,784    10/1945    Thomas _____ 260—94.9
2,815,334    12/1957    Killey _____ 260—94.9

FOREIGN PATENTS 808,144    1/1959    Great Britain.

JOSEPH L. SCHOFER, *Primary Examiner.*

F. L. DENSON, *Assistant Examiner.*